US009304928B2

(12) United States Patent
Udayashankar et al.

(10) Patent No.: US 9,304,928 B2
(45) Date of Patent: Apr. 5, 2016

(54) SYSTEMS AND METHODS FOR ADAPTIVE PREFETCHING

(71) Applicant: NetApp, Inc., Sunnyvale, CA (US)

(72) Inventors: Kishore Kasi Udayashankar, San Jose, CA (US); Swetha Krishnan, Sunnyvale, CA (US); Kiran Srinivasan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 232 days.

(21) Appl. No.: 13/951,662

(22) Filed: Jul. 26, 2013

(65) Prior Publication Data

US 2015/0032967 A1 Jan. 29, 2015

(51) Int. Cl.
*G06F 12/08* (2006.01)

(52) U.S. Cl.
CPC .... *G06F 12/0862* (2013.01); *G06F 2212/6024* (2013.01); *G06F 2212/6026* (2013.01)

(58) Field of Classification Search
CPC ............ G06F 12/0862; G06F 12/0866; G06F 8/4442; G06F 2212/6024; G06F 2212/6026; G06F 2212/6028
See application file for complete search history.

(56) References Cited

U.S. PATENT DOCUMENTS

| 6,701,316 | B1 * | 3/2004 | Li ..................... G06F 17/30902 370/395.41 |
| 2001/0001873 | A1 * | 5/2001 | Wickeraad et al. ........... 711/136 |
| 2004/0205298 | A1 * | 10/2004 | Bearden et al. .............. 711/137 |
| 2004/0205299 | A1 * | 10/2004 | Bearden ........................ 711/137 |
| 2005/0144394 | A1 * | 6/2005 | Komarla ............. G06F 12/0862 711/137 |
| 2006/0026365 | A1 * | 2/2006 | Yamazaki ..................... 711/137 |
| 2006/0294315 | A1 * | 12/2006 | Iren et al. ..................... 711/137 |
| 2011/0153988 | A1 * | 6/2011 | Sun .............................. 711/125 |
| 2011/0246722 | A1 * | 10/2011 | Taha et al. .................... 711/137 |

FOREIGN PATENT DOCUMENTS

WO    WO 2006117329 A2 *  11/2006

* cited by examiner

*Primary Examiner* — Michael Krofcheck
(74) *Attorney, Agent, or Firm* — Matthew A. Pequignot; Pequignot + Myers LLC

(57) ABSTRACT

Systems and methods which provide for improved prefetching schemes for caching data in a storage network are described. In one embodiment, a dynamically adaptive prefetching mechanism based on block access history information and prior effectiveness of prefetching is provided. Embodiments may take into account prefetch efficiency; a dynamic value indicating the usefulness of past prefetches, prefetch wastage, in conjunction with prefetch resources available at any point in time, to determine the number of blocks to read-ahead during a prefetch. Such embodiments provide improvements over file-based prefetching and previous block schemes, as they provide a finer grain of control over both prefetch block selection, and the number of blocks to prefetch based on block (or block range) access history.

23 Claims, 4 Drawing Sheets

SYSTEMS AND METHODS FOR ADAPTIVE PREFETCHING

TECHNICAL FIELD

The present application relates generally to storage networks and, more particularly, to prefetching data stored in a storage network to cache for later access by a client.

BACKGROUND

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated within the data storage system and/or between data storage systems during normal operation. For example, when one or more users desire to access or download files, a portion or even the entire contents of a data volume may be sent across the network to be accessed by the user. Such communications may take place between multiple nodes of the storage network, between a storage array and one or more nodes, between other communication devices on the network (e.g. switches and relays), etc.

One issue that has arisen with the creation of new data storage technologies is that various components are configured to store data on media which have different storage characteristics, capacities, cost and reliability. These storage media introduce new storage designs that may have processing components with speed capabilities which are much higher compared to data storage component speeds. To bridge this gap, caching is a common solution where a storage tier that is faster, smaller and more expensive contains a copy ("cache") of the most reused parts of the working data set at any point in time, while the data set in its entirety resides on a slower, larger, cheaper storage tier. Due to cost considerations, it is prudent to wisely manage these data caches to maximize performance. Consequently, data is often cached ahead of time before the read request comes in for such a data.

Prefetching is a technique to fetch data ahead of time before the input/output (I/O) request for that data arrives so that the cost of a cache miss (e.g. having to fetch data at a slower component) can be avoided. Prefetching can be classified into two broad categories (1) sequential prefetching and (2) history based prefetching. One other dimension in prefetching is to determine the amount of data to be prefetched, which leads to classifying prefetching schemes into (1) N-block lookahead and (2) adaptive prefetch. While sequential prefetching works well for workloads that are dominated by sequential accesses, history-based prefetching is useful for workloads that have random data accesses and repeating patterns of accesses.

One common use of sequential prefetching includes using a sequential prefetching scheme with N-block look-ahead in the file space. This is based on the assumption that a client's data requests are sequential in a file's context. While such read-ahead requests are file-based, these methods generally do not take into account the inter-file block requests and data requests from multiple such clients interleaved with each other.

There are several history-based prefetching schemes that are file-based such as "Design and Implementation of a Predictive File Prefetching Algorithm" by Kroeger et. al. that uses a technique called Extended Partition Context Modelling which takes into account the prefetch lead time. Another similar technique has been proposed by Griffieon et. al. in "Reducing File System Latency using a Predictive Approach," which uses "lookahead period" as the criterion to relate file accesses. But these approaches are coarse-grained since they are based on files not blocks, and also do not consider important factors such as prefetch wastage and cost of a prefetch. Working at a file granularity has several drawbacks: a) metadata prefetching is not possible if the metadata of the file system is not stored in the form of files, and b) prefetching cost is increased due to "prefetch wastage" by bringing into the cache the entire file's data even though some of the blocks of the file may not be seen in the client's request stream. Also, most history-based prefetching schemes are not adaptive and do not dynamically vary the amount of data to prefetch and what data to prefetch, but use a coarse-grained fixed threshold to cut off what to bring into the cache.

Another approach is discussed in "A Prefetching Scheme Exploiting Both Data Layout and Access History on the Disk" by Song et al. This approach functions at block-granularity and also takes into account history information. However, while this system tries to minimize the penalty of a mis-prefetch, it does not adapt it with a heuristic, but simply uses a boundary for the mis-prefetch percent to continue or stop prefetching altogether. It is also not sensitive to the time of prefetch, e.g., when to initiate a prefetch such that cache hits are maximized without incurring wasted prefetches.

BRIEF DESCRIPTION OF THE DRAWINGS

For a more complete understanding, reference is now made to the following descriptions taken in conjunction with the accompanying drawings, in which:

FIG. 6 illustrates a method for managing communications in a storage network in accordance with an embodiment of present application.

DETAILED DESCRIPTION

The present application provides for systems and methods which provide for improved prefetching schemes for caching data in a storage network. In one embodiment, a dynamically adaptive prefetching mechanism based on block access history information and prior effectiveness of prefetching is provided. Embodiments may take into account prefetch efficiency; a dynamic value indicating the usefulness of past prefetches, prefetch wastage, in conjunction with prefetch resources available at any point in time, to determine the number of blocks to read-ahead during a prefetch. Such embodiments provide improvements over file-based prefetching and previous block schemes, as they provide a finer grain of control over both prefetch block selection, and the number of blocks to prefetch based on block (or block range) access history.

In one embodiment, information regarding client access to data is collected in terms of block ranges, along with statistics of block range accesses over a period of time. This history information is used subsequently to determine which blocks to read ahead. In some embodiments, block ranges that are actually previously accessed in a client's I/O stream are included in the history information whereas blocks which are not accessed are not included. This allows for finer granularity in predicting future access to data, and allows embodiments to not have to maintain state information for blocks outside these accessed blocks. Additionally, because of the finer granularity, embodiments can be put to use in multiple storage tiers that work in a caching model without depending on the actual addressing scheme of a particular storage tier (e.g. disk blocks, virtual container blocks, memory pages, etc.)

In one embodiment prefetching may be implemented in a two-step decision: (1) selection of blocks to be prefetched and (2) number of blocks to be prefetched. Prefetching an accurate number of blocks reduces prefetch wastage cost and prevents limited resources available in the system from caching data blocks that may not be used immediately. In an example adaptive prefetching method the cache hit ratio may be maximized, while at the same time minimizing prefetch wastage and total prefetch cost involved. Such a method may adapt itself dynamically on multiple axes, for example, on the amount of data to prefetch ("depth" of history to prefetch), and on which blocks or branches of the history to prefetch ("breadth" of history to prefetch).

Figure 1:
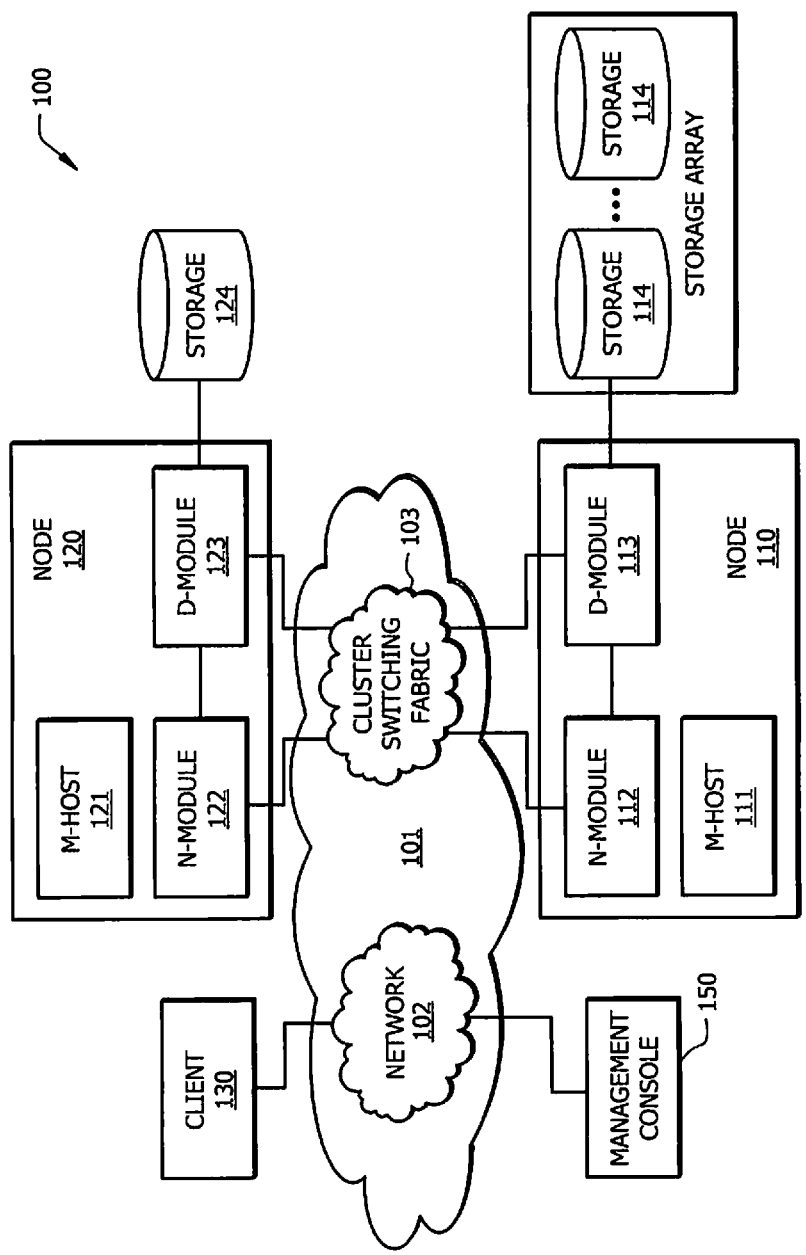
FIG. 1 illustrates a block diagram of storage system in accordance with an embodiment of the application.

The foregoing has outlined rather broadly the features and technical advantages of the exemplary embodiment in order that the detailed description of the embodiments of the application that follows may be better understood. Additional features and advantages of the embodiments of the application will be described hereinafter which form the subject of the claims of the application. It should be appreciated by those skilled in the art that the conception and specific embodiment disclosed may be readily utilized as a basis for modifying or designing other structures for carrying out the same purposes of the embodiments of the application. It should also be realized by those skilled in the art that such equivalent constructions do not depart from the spirit and scope of the embodiments of the application as set forth in the appended claims. The novel features which are believed to be characteristic of the embodiments of the application, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the embodiments of the application FIG. 1 provides a block diagram of storage system 100 in accordance with an embodiment of the application. System 100 includes a storage cluster having multiple nodes 110 and 120 which are adapted to communicate with each other and any additional nodes of the cluster. Nodes 110 and 120 are configured to provide access to data stored on a set of storage devices (shown as storage devices 114 and 124) constituting storage of system 100. Storage services may be provided by such nodes implementing various functional components that cooperate to provide a distributed storage system architecture of system 100. Additionally, one or more storage devices, such as storage array 114, may act as a central repository for storage system 100. It is appreciated that embodiments may have any number of edge nodes such as multiple nodes 110 and/or 120. Further, multiple storage arrays 114 may be provided at the multiple nodes 110 and/or 120 which provide resources for mirroring a primary storage data set.

Illustratively, nodes (e.g. network-connected devices 110 and 120) may be organized as one or more network elements (N-modules 112 and 122) and/or storage elements (D-modules 113 and 123) and a management element (M-host 111 and 121). N-modules may include functionality to enable nodes to connect to one or more clients (e.g. network-connected device 130) over computer network 101, while D-modules may connect to storage devices (e.g. as may implement a storage array). M-hosts may provide cluster communication services between nodes for generating information sharing operations and for presenting a distributed file system image for system 100. Functionality for enabling each node of a cluster to receive name and object data, receive data to be cached, and to communicate with any other node of the cluster may be provided by M-hosts adapted according to embodiments of the application.

It should be appreciated that network 101 may comprise various forms, and even separate portions, of network infrastructure. For example, network-connected devices 110 and 120 may be interconnected by cluster switching fabric 103 while network-connected devices 110 and 120 may be interconnected to network-connected device 130 by a more general data network 102 (e.g. the Internet, a LAN, a WAN, etc.).

It should also be noted that while there is shown an equal number of N- and D-modules constituting illustrated embodiments of nodes, there may be a different number and/or type of functional components embodying nodes in accordance with various embodiments of the application. For example, there may be multiple N-modules and/or D-modules interconnected in system 100 that do not reflect a one-to-one correspondence between the modules of network-connected devices 110 and 120. Accordingly, the description of network-connected devices 110 and 120 comprising one N- and one D-module should be taken as illustrative only and it will be understood that the novel technique is not limited to the illustrative embodiment discussed herein.

Network-connected device 130 may be a general-purpose computer configured to interact with network-connected devices 110 and 120 in accordance with a client/server model of information delivery. To that end, network-connected device 130 may request the services of network-connected devices 110 and 120 by submitting a read or write request to the cluster node comprising the network-connected device. In response to the request, the node may return the results of the requested services by exchanging information packets over network 101. Network-connected device 130 may submit access requests by issuing packets using application-layer access protocols, such as the Common Internet File System (CIFS) protocol, Network File System (NFS) protocol, Small Computer Systems Interface (SCSI) protocol encapsulated over TCP (iSCSI), SCSI encapsulated over Fibre Channel (FCP), and SCSI encapsulated over Fibre Channel over Ethernet (FCoE) for instance.

To facilitate requests from network connected device 130, one or more devices 110 and 120 may contain cache memory resources which are configured to store prefetched information that is otherwise stored on storage array 114 or in storage 124. Such cache memory may function to allow for quicker access to data from device 130. The cache storage may be located at a node in the network that is closer to the edge of a storage network, so as to facilitate faster data transfer to the end user. Further, the location of cache storage may be at a device which has better bandwidth or processing resources such that it is able to efficiently service network connected device 130 while also taking into account other considerations of the storage network (e.g. the need to service multiple clients, limits on bandwidth, etc.). Moreover, cache memory resources for a particular client or network connected device 130 may be utilized on multiple devices/nodes (such as on devices 110 and 120) in accordance with some aspects.

System 100 may further include a management console (shown here as management console 150) for providing management services for the overall cluster. Management console 150 may, for instance, communicate with network-connected devices 110 and 120 across network 101 to request operations to be performed at the cluster nodes comprised of the network-connected devices, and to request information (e.g. node configurations, operating metrics) from or provide information to the nodes. In addition, management console 150 may be configured to receive inputs from and provide outputs to a user of system 100 (e.g. storage administrator) thereby operating as a centralized management interface between the administrator and system 100. In the illustrative embodiment, management console 150 may be networked to network-connected devices 110-130, although other embodiments of the application may implement management console 150 as a functional component of a node or any other processing system connected to or constituting system 100.

Management console 150 may also include processing capabilities and code which is configured to control system 100 in order to allow for management of tasks within network 100. For example, management console 150 may be utilized to configure/assign various nodes to function with specific clients, storage volumes, etc. Further, management console 150 may configure a plurality of nodes to function as a primary storage resource for one or more clients and a different plurality of nodes to function as secondary resources, e.g. as disaster recovery or high availability storage resources, for the one or more clients.

In some embodiments, management console 150 may include processing resources which are configured to manage caching and prefetching of data for one or more client devices (e.g. network connected device 130). For example, management console 150 may be configured to maintain history information with respect to data block ranges which are accessed for a particular client and prior effectiveness of prefetching for the client. More specifically, management console 150 may include processing resources which monitor prefetch efficiency, e.g. one or more of a dynamic value indicating the usefulness of past prefetches, prefetch wastage, in conjunction with prefetch resources available at any point in time, to determine the number of blocks to read ahead during a prefetch. The types of information which can be monitored and utilized to make determinations regarding prefetching are discussed in more detail below.

It is noted that the processing capabilities and control discussed above with respect to management console 150 may also be distributed, entirely or in part, to processing resources on one or more nodes, or in some cases on a client device. Moreover, processing resources of the nodes may work in conjunction with management console 150 to implement adaptive prefetching methods described herein.

In a distributed architecture, network-connected device 130 may submit an access request to a node for data stored at a remote node. As an example, an access request from network-connected device 130 may be sent to network-connected device 120 which may target a storage object (e.g. volume) on network-connected device 110 in storage 114. This access request may be directed through network-connected device 120 due to its proximity (e.g. it is closer to the edge than a device such as network-connected device 110) or ability to communicate more efficiently with device 130. To accelerate servicing of the access request and optimize cluster performance, network-connected device 120 may prefetch and cache the requested volume in local memory within a node or in storage 124.

As can be appreciated from the foregoing, in order to operate as a cluster (e.g. the aforementioned data storage system), network-connected devices 110-130 may communicate with each other. Such communication may include various forms of communication (e.g. point-to-point or unicast communication, multicast communication, etc.). Such communication may be implemented using one or more protocols such as CIFS protocol, NFS, iSCSI, FCP, FCoE, and the like. Accordingly, to effectively cooperate to provide desired operation as a logical entity, each node of a cluster is provided with the capability to communicate with any and all other nodes of the cluster according to embodiments of the application.

As discussed above, embodiments may maintain history information of client accesses to data in terms of block ranges and use the history to read-ahead specific blocks rather than full files. The amount data to prefetch may be varied by applying an algorithm which optimizes which blocks to read in order to reduce cache pollution and wastage. Additionally, embodiments may prune the amount of history to maintain by taking into account one or more of the prefetch efficiency (to minimize prefetch wastage), the prefetch cost (the total cost of fetching the data from the slower storage tier, including various components such as latency, bandwidth used and bytes transferred), and the like.

Prefetch efficiency may be seen as the ratio of prefetched blocks that were accessed before being evicted from cache and the total amount of prefetched blocks.

$$\text{Prefetch effeciency } (P_e) = \frac{\text{\# of Prefetched blocks accessed}}{\text{\# of Prefetched blocks}}$$

Additionally, the read-hit ratio may be seen as the ratio of total cache hits and total block read requests.

$$\text{read-hit ratio } (H_r) = \frac{\text{\# of cache hits}}{\text{\# of block requests}}$$

These values and the application of their use in adaptive prefetching in accordance with embodiments are discussed below.

Data Access History

In a distributed shared storage network multiple disks are part of a reliability group and exported to hosts as a storage container (volume). Multiple storage containers can exist in a storage controller. Additionally, each volume is potentially used by multiple applications on a host and I/O requests to files on a container are interleaved as seen by the storage container.

Figure 2:
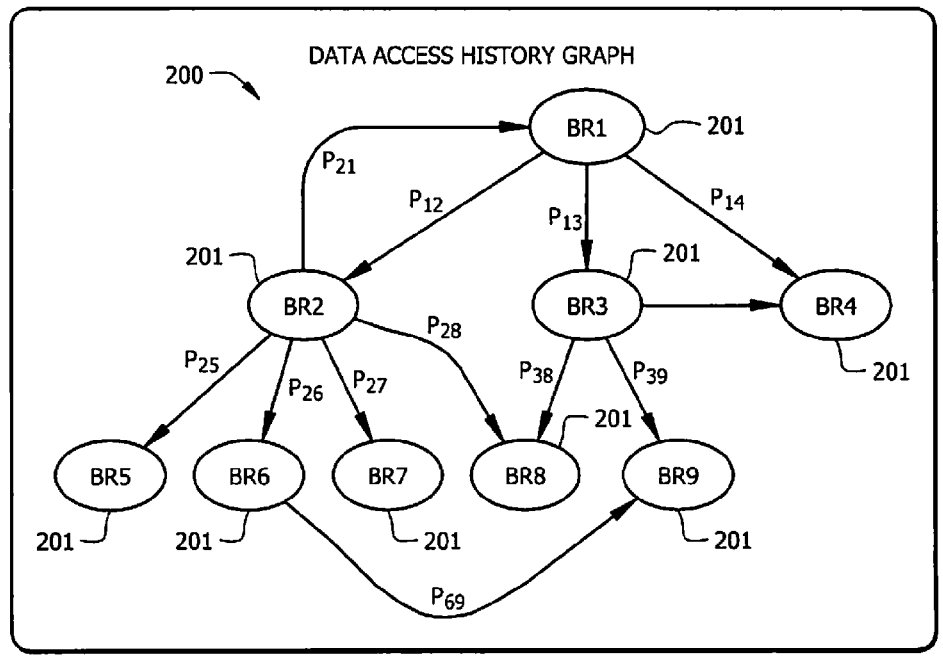
FIG. 2 illustrates an exemplary history of block accesses in a graph datastructure in accordance with an embodiment of the application.

In one embodiment, every volume in a storage controller may maintain a history of block accesses in a graph datastructure 200, as shown in FIG. 2, where each node 201 in the graph is a contiguous range of blocks. BR<X> is a node in the graph representing the access history of a given block range. |BR<x>| is the range of node(s) BR<X>, e.g. the number of blocks represented by node BR<X>. An edge from node BR<X> to a second node BR<Y> denotes the probability (e.g. $P_{12}$ or $P_{21}$) of an access to BR<Y> after an access to BR<X>.

The probability of seeing an access pattern of BR<X> followed by BR<Y> and BR<Z> is defined as the product of probabilities of all the edges between the nodes in the path, if such an edge exists in the graph.

$$\text{Path, } P_i = [BR\langle X\rangle, BR\langle Y\rangle, BR\langle Z\rangle] = \sum_{j=x}^{z} P_{j,j+1}$$

The total number of blocks in path $P_i$ is defined as the sum of all the blocks in each of the nodes in the path.

$$\text{Total block count in } P_i = |P_i| = \sum_{i=x}^{z} |BR\langle i\rangle|$$

The probabilities on each of the edges represent the point in time access history of the block ranges. These probabilities may be modified with every block access. For example, the more times an access from BR<X> to BR<Y> is seen, the higher the probability will be on that edge.

Figure 3:
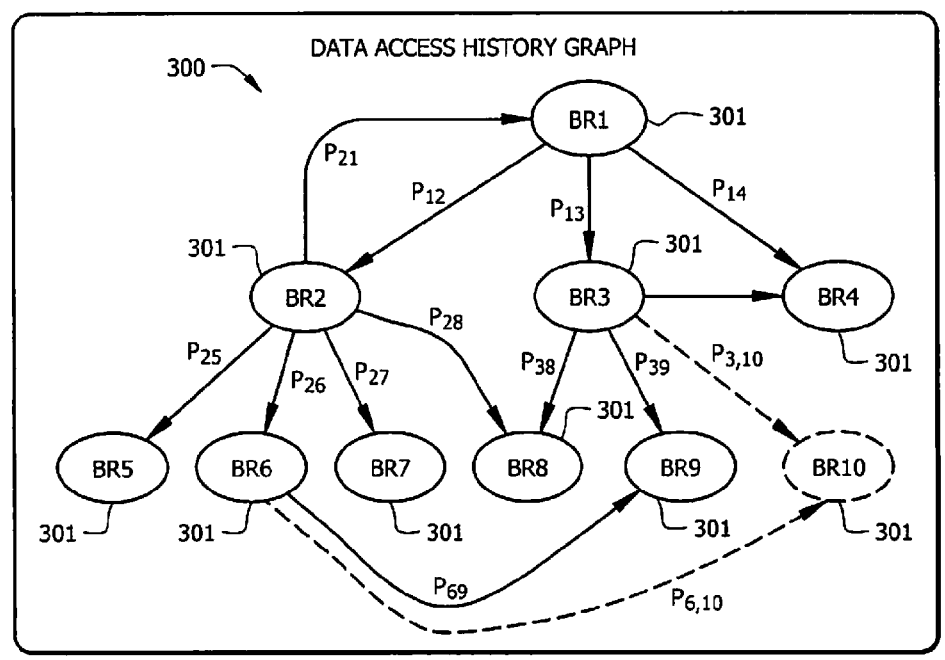
FIG. 3 illustrates an exemplary data access history graph in accordance with an embodiment of the application.

FIG. 3 illustrates a data access history graph 300 which reflects changes in block range history information. When an access to a new block range (e.g. other than the existing block ranges which are present in the history graph) occurs, a new node is added to the graph (see BR10). If the new block range is a subset of an existing block range, then the node is split into two or more nodes, as shown in FIG. 3, appropriately representing the new non-overlapping block ranges and new incoming and outgoing edges are added between the nodes to represent the revised probabilities of access to each of these block ranges. When adjusting probabilities, embodiments may maintain the invariant that the sum of the probabilities of all the outgoing edges from a node is equal to 1.

Adapting Amount to Prefetch and Prefetch Timing

When a "hit" on a certain block range (i.e. the storage system instructs the blocks to be fetched for client access), embodiments may apply an algorithm, e.g. an Adaptive Multi-stream Prefetching (AMP) algorithm. Such an algorithm may provide a mechanism to dynamically adapt the rate at which blocks are prefetched into cache and also when to initiate a prefetch. The AMP algorithm to get a value of 'p' which represents the number of blocks to be prefetched. This value may then be varied based on previous accesses and evictions. In some instances, 'p' may be incremented by the number of blocks in the read I/O request whenever there is a hit on the last block in a read access request for a certain block range. Conversely, 'p' may be decremented whenever the last block in a set of prefetched blocks is evicted from the cache before being accessed. Such incrementing and decrementing may be implemented after a particular hit or miss of a block being accessed. Additionally, this may be implemented after multiple accesses of a particular range and observing multiple hits or misses of one or more blocks being accessed.

Embodiments may use 'p' as an upper bound on how deep to go explore when determining paths to traverse from a certain node in the graph. As in AMP, the "trigger distance" (e.g. when to initiate a prefetch) may also be varied. The trigger distance 'g' represents distance (number of blocks) from the end of the prefetch window, if accessed, will lead to a subsequent prefetch being initiated. For example, g=0 means a prefetch may be initiated only when the last block in the current prefetched set gets accessed. Higher values of g may indicate that initiation of a prefetch will preferably be implemented sooner. In some embodiments, 'g' is incremented if, on the completion of a prefetch, there is already a read waiting for the first block range within the prefetch set as such a wait indicates that the prefetch of data would preferably have started earlier (which would happen with a higher 'g'). Conversely, 'g' is decremented when 'p' itself is decremented. In some aspects, 'g' may be utilized to decide when to start a new prefetch along a certain branch in the history graph (e.g. to set the trigger node along a certain path).

Pruning Blocks for Prefetching

Upon receiving a hit on for a block range, such as node BR<X> in the graph of FIGS. 1-2, embodiments may traverse all possible paths from that node to obtain a list of prefetch candidate paths: $\{P_i\}$, i=1 to n; where n is the number of outgoing edges from that node. For each candidate path $P_i$, embodiments may add each successive node in that path if the sum of block range sizes is less than or equal to 'p', the bound on number of prefetched blocks from AMP. In other words, embodiments may check that $\Sigma|BR\langle Y\rangle|<=p$ for every Y that is a node in the path $P_i$. The calculations will stop at the point when this condition is not satisfied, and then move on to explore path $P_i+1$ similarly. For each path, a "trigger node" is also set based on the trigger distance 'g' value derived by applying AMP. When a trigger node is accessed among a prefetched node, embodiments may initiate a new prefetch along paths rooted at this node.

Once a list of candidate paths is established, with each path having a total block range size <=p, embodiments may determine whether bringing in all the nodes of all these paths into the cache will be of value and will not incur unnecessary cost. To do so, a varying threshold 't' may be defined which is used to prune which candidate paths should be prefetched, and which ones can be ignored. In some embodiments 't' is a function of one or more of a) prefetch efficiency (as defined above), and b) cost which is a metric based on one or more of the number of bytes fetched, transfer latency, bandwidth used and inter-arrival times of requests. It is noted that 't' may constantly vary as the factors it depends on may vary with cache hits and misses.

A simple function for 't' in accordance with one aspect could be defined as t=1/(Prefetch Efficiency/Cost). Such a function ensures that prefetch efficiency is maximized while the cost is minimized (e.g. if a high prefetch efficiency and low cost are present, a low threshold ('t') value may be utilized and additional branches may be fetched). With a threshold defined, candidate paths may be prefetched whose path probabilities are >=t, where path probability of a candidate path $P_i$ is the product of probabilities of all edges between nodes that have been included in that path $P_i$ as per the size bound criterion. This is illustrated in FIG. 4.

Figure 4:
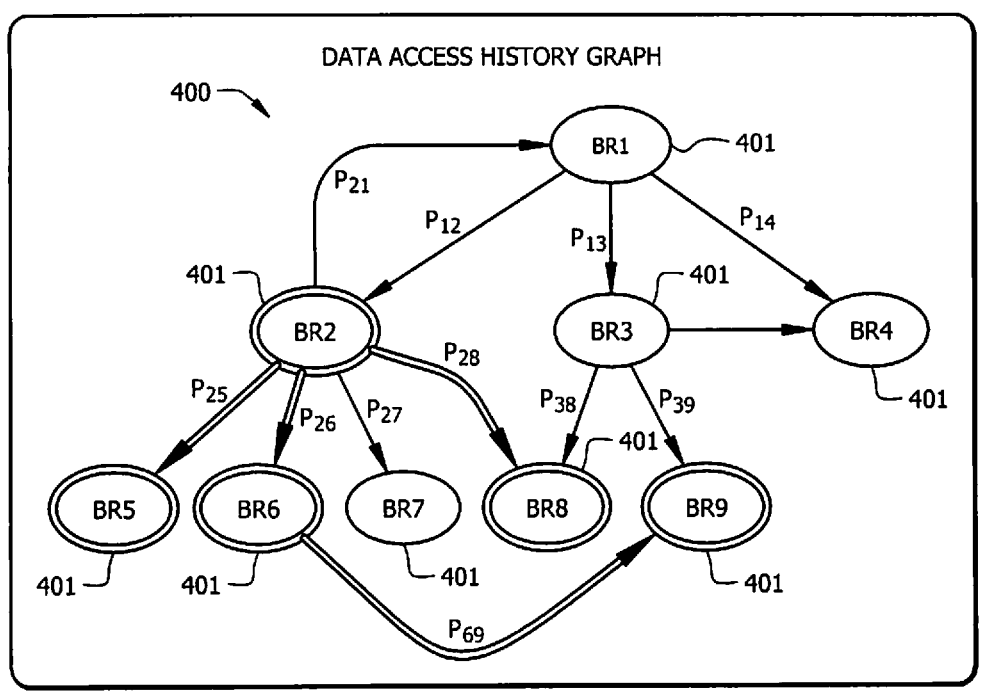
FIG. 4 illustrates an example data access history graph datastructure in accordance with an embodiment of the application.

Specifically, FIG. 4 illustrates a data access graph 400 which shows pruning of candidate paths based on comparisons to a threshold value. The blocks indicated by double lines are prefetched into cache. In the illustrated example, there are five candidate paths identified for prefetch, specifically, i) BR2, BR1; ii) BR2, BR5; iii) BR2, BR6, BR9; iv) BR2, BR7; v) BR2, BR8. Among these five possible prefetch paths from BR1, paths (1) and (4) are pruned based on threshold 't' mentioned above i.e., for (1) $P_{12}*P_{21}<$'t' and (4) $P_{12}*P_{27}<$'t'.

It is noted that embodiments may check at each point in a path to ensure that there is enough room in the cache for the blocks which are about to be prefetched, otherwise the number of blocks prefetched will be limited to what the available cache space permits.

Accordingly, embodiments of the present application provide multiple unique aspects over what is known in the art which improves efficiency of prefetching methods. For example, maintaining history on a block-range basis (at client I/O granularity rather than a file granularity) allows present schemes to be applied between any two storage tiers that work in a caching model and does not depend on the actual addressing scheme of the storage tier underneath (be it disk blocks or virtual container blocks or memory pages).

Additionally, applying an existing algorithm (such as AMP), in a new context (e.g. for history-based prefetching, to bring in the value of adaptively varying "how much" to prefetch and "when" to prefetch), as opposed to using AMP by itself works on purely sequential accesses, provides for a novel way to implement a history-based approach and to make determinations regarding how deep to explore an access history graph. Such methods provide benefits for minimizing wasted prefetches and minimizing cache pollution seen in prior history-based approaches.

Further, adaptive pruning methods to modify the paths to prefetch from amongst candidate paths by using a varying rather than fixed threshold provides for significant efficiency improvements. This heuristic technique allows for a prefetch set be more optimal by selecting only the paths that are most likely to be utilized. This varying threshold is aimed at optimizing prefetch efficiency and cost. Thus, aspects may minimize prefetch wastage (such as number of prefetched blocks that remain unaccessed), and also may minimize the total cost involved in fetching the blocks from their primary storage tier.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
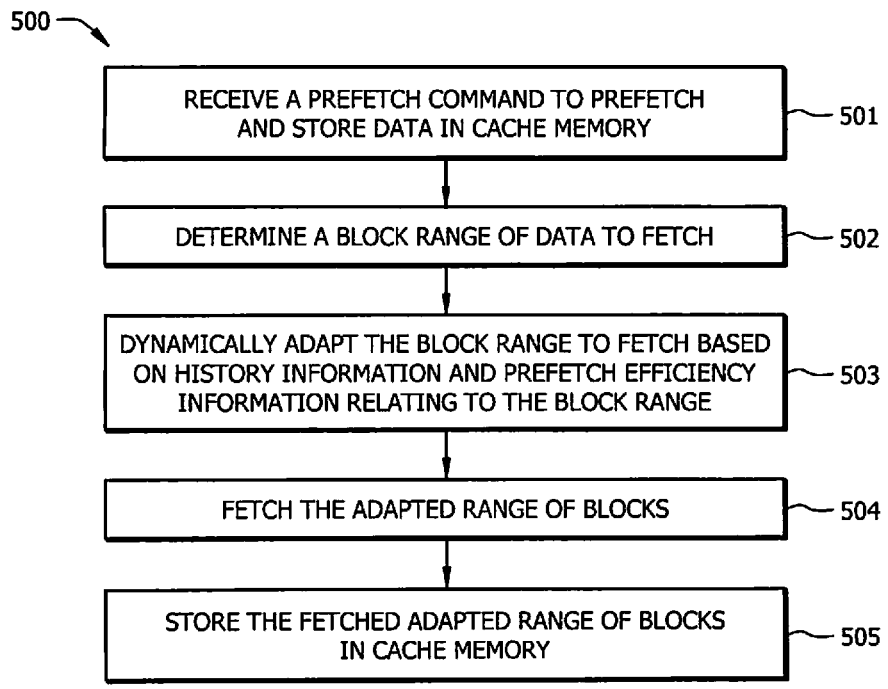
FIG. 5 illustrates a method for managing communications in a storage network in accordance with an embodiment of the present application.

FIG. 5 illustrates a method 500 for prefetching data in a storage network in accordance with an embodiment of the present application. It is noted that embodiments of method 500 may be implemented within the storage networks described above with respect to FIGS. 1-4. Specifically, method 500 may include, at block 501, receiving a prefetch command to prefetch and store data in cache memory. At block 502, method 500 may further include determining a block range of data to fetch. Additionally, method 500 may include at block 503 dynamically adapting the block range to fetch based on history information and prefetch efficiency information relating to the block range. With the adapted range, method 500 may fetch the adapted range of blocks at block 504 and store the fetched adapted range of blocks in cache memory at block 505.

It is noted that the above steps may be implemented with the assistance of one or more processing resources such as processing resources within one or more nodes 110 and 120 and/or within management console 150. In more detailed aspects method 500 may further include dynamically adapting the block range in response to prefetch cost data (e.g. data relating to latency, bandwidth of the storage network, cost of using different storage resources in the storage network, etc.). Further, method 500 may include identifying candidate prefetch path block ranges and adaptively adding block ranges of candidate paths to the range of blocks to be fetched based on a varying threshold which may account for one or more of prefetch cost, efficiency, transfer latency, available bandwidth and number of available blocks in the cache memory.

Figure 6:
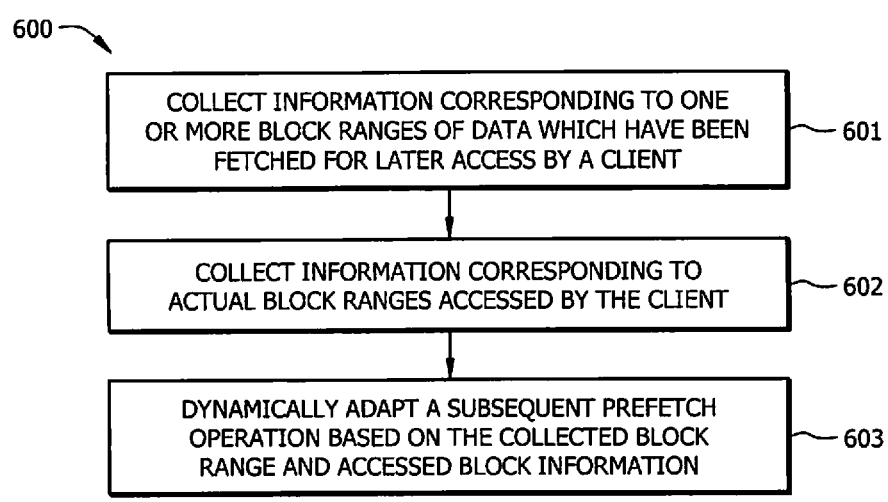
FIG. 6 illustrates a method for implementing adaptive prefetching in a storage network in accordance with an embodiment of the present application.

FIG. 6 illustrates a method 600 for implementing adaptive prefetching in a storage network in accordance with an embodiment of the present application. It is noted that embodiments of method 600 may be implemented within the storage networks described above with respect to FIGS. 1-4. Specifically, method 600 may include, at block 601, collecting information corresponding to one or more block ranges of data which have been fetched for later access by a client. Method 600 may further include, at block 602, collecting information corresponding to actual block ranges accessed by the client. Moreover, method 600 may include, at block 603 dynamically adapting a subsequent prefetch operation based on the collected block range and accessed block information.

As with the method of FIG. 5, method 600 may be implemented with the assistance of one or more processing resources such as processing resources within one or more nodes 110 and 120 and/or within management console 150. In more detailed aspects method 600 may further include dynamically adapting the block range in response to prefetch cost data (e.g. data relating to latency, bandwidth of the storage network, cost of using different storage resources in the storage network, etc.). Further, method 600 may include identifying candidate prefetch path block ranges and adaptively adding block ranges of candidate paths to the range of blocks to be fetched based on a varying threshold which may account for one or more of prefetch cost, efficiency, transfer latency, available bandwidth and number of available blocks in the cache memory.

Those of skill would further appreciate that the various illustrative logical blocks, modules, circuits, and algorithm steps described in connection with the application herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

It is also appreciated that the systems and method described herein are able to be scaled for larger storage network systems. For example, a cluster may include hundreds of nodes, multiple virtual servers which service multiple clients and the like. Such modifications may function according to the principles described herein.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above embodiments of the application, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for prefetching data in a storage system, said method comprising:
   determining, by at least one processing device, a block range of data to fetch;
   for a storage volume, determining block range access history information by,
      identifying one or more of multiple block ranges that have been accessed in the storage volume; and
      based on patterns of access to the block ranges, determining for each of one or more of the accessed block ranges, a probability value representing a probability that a particular one of the block ranges will be accessed subsequent to accessing the block range, wherein the probability is relative to a total probability of accesses to other of the block ranges subsequent to accessing the block range;
   dynamically adapting, by the at least one processing device, a breadth and a depth of the block range to fetch based, at least in part, on the block range access history information, wherein the block range breadth determines an identity of the block range to fetch and the block range depth determines a length of the block range to fetch;
   fetching the adapted block range; and
   storing the fetched adapted block range in cache memory.

2. The method of claim 1, further comprising dynamically adapting the length of the block range to fetch in response to prefetch efficiency data.

3. The method of claim 2, wherein prefetch efficiency data includes data relating to one or more of latency and bandwidth of the storage system.

4. The method of claim 2, wherein prefetch efficiency data includes data relating to resource consumption incident to using different storage resources in the storage system.

5. The method of claim 1, wherein the prefetch efficiency data includes a number of prefetched blocks accessed by a client device divided by a number of total prefetched blocks.

6. The method of claim 1, further comprising identifying candidate prefetch path block ranges based on the block range access history information and adaptively removing block ranges of candidate paths from the range of blocks to be fetched based on a varying threshold.

7. The method of claim 6, wherein the varying threshold accounts for one or more of prefetch efficiency, transfer latency, available bandwidth and amount of unoccupied block space in the cache memory.

8. The method of claim 1, wherein prefetching is implemented independent of a file system addressing scheme of storage resources that store data to be fetched.

9. A method for implementing adaptive prefetching, said method comprising:
   collecting, by at least one processing device, block range prefetch information corresponding to one or more block ranges of data that have been fetched for later access by a client;
   collecting, by the at least one processing device, block range access information corresponding to block ranges accessed by the client, wherein said collecting block range access information includes,
      identifying, based at least in part on the collected block range prefetch information, multiple block ranges of contiguous data blocks that have been accessed in the storage volume; and
      based on patterns of access to the block ranges, determining for each of one or more of the block ranges, a probability value representing a probability that a particular one of the block ranges will be accessed subsequent to accessing the block range, wherein the probability is relative to a total probability of accesses to other of the block ranges subsequent to accessing the block range;
   and
   dynamically adapting, by the at least one processing device, a breadth and a depth of a block range for a subsequent prefetch operation based on the collected block range prefetch information and block range access information, wherein the block range breadth determines an identity of the block range to fetch and the block range depth determines a length of the block range to fetch.

10. The method of claim 9, wherein dynamically adapting the block range depth of a subsequent prefetch operation is performed based on collected prefetch efficiency data.

11. The method of claim 10, wherein the prefetch efficiency data includes data relating to one or more of latency and bandwidth of a storage system.

12. The method of claim 10, wherein the prefetch efficiency data includes data relating to resource consumption incident to using different storage resources in a storage system.

13. The method of claim 10, wherein prefetch efficiency data indicates a number of prefetched blocks accessed by a client device divided by a number of total prefetched blocks.

14. The method of claim 9, further comprising identifying candidate prefetch path block ranges based on the block range access history information and adaptively removing block ranges of candidate paths from the range of blocks to be prefetched in a subsequent prefetch operation based on a varying threshold.

15. The method of claim 14, wherein the varying threshold accounts for one or more of prefetch efficiency, transfer latency, available bandwidth and amount of unoccupied block space in the cache memory.

16. A computer program product, comprising:
    a non-transitory computer-readable medium comprising code for causing a computer to:

determine, by the at least one processing device, a block range of data to fetch;

for a storage volume, determine block range access history information by, identifying one or more of the multiple block ranges that have been accessed in the storage volume; and based on patterns of access to the block ranges, determining for each of one or more of the block ranges, a probability value representing a probability that a particular one of the block ranges will be accessed subsequent to accessing the block range, wherein the probability is relative to a total probability of accesses to other of the block ranges subsequent to accessing the block range;

dynamically adapt, by the at least one processing device, a breadth and a depth of the block range to fetch based, at least in part, on the block range access history information, wherein the block range breadth determines the identity of the block range to fetch and the block range depth determines the length of the block range to fetch;

fetch the adapted block range; and store the fetched adapted block range in cache memory.

17. The computer program product of claim 16, wherein the code further causes the computer to dynamically adapt the block range in response to prefetch efficiency data.

18. The computer program product of claim 17, wherein the prefetch efficiency data includes data relating to one or more of latency and bandwidth of a storage system.

19. The computer program product of claim 17, wherein the prefetch cost data includes data relating to resource consumption of using different storage resources in a storage system.

20. The computer program product of claim 16, wherein the prefetch efficiency data includes a number of prefetched blocks accessed by a client device divided by a number of total prefetched blocks.

21. The computer program product of claim 16, wherein the code further causes the computer to identify candidate prefetch path block ranges based on the block range access history information and adaptively removing block ranges of candidate paths from the range of blocks to be fetched based on a varying threshold.

22. The computer program product of claim 21, wherein the varying threshold accounts for one or more of prefetch efficiency, transfer latency, available bandwidth and amount of unoccupied block space in the cache memory.

23. The computer program product of claim 16, wherein prefetching is implemented independent of the file system addressing scheme of storage resources that store data to be fetched.

* * * * *